United States Patent [19]
Collins et al.

[11] 4,162,245
[45] Jul. 24, 1979

[54] METHOD OF PREPARING AN IMPROVED ORGANIC RESIN COMPOSITION AND AN IMPROVED ORGANIC RESIN THEREBY

[75] Inventors: Warde T. Collins; Mary D. Fey, both of Midland, Mich.

[73] Assignee: Dow Corning Corporation, Midland, Mich.

[21] Appl. No.: 868,009

[22] Filed: Jan. 9, 1978

[51] Int. Cl.² .............................................. C08K 9/06
[52] U.S. Cl. ............................. 260/40 R; 260/37 EP; 260/37 N; 260/37 SB; 260/42.15
[58] Field of Search .............. 260/40 R, 42.15, 37 EP, 260/37 N, 37 SB

[56] References Cited
U.S. PATENT DOCUMENTS

| 3,472,729 | 10/1969 | Sterman et al. | 260/42.15 |
| 3,555,051 | 1/1971 | Marsden et al. | 260/42.15 |
| 3,969,314 | 7/1976 | Grigull | 260/42 |
| 4,062,693 | 12/1977 | Berger | 106/308 Q |

OTHER PUBLICATIONS

Modern Plastics Encyclopedia, 1967, Sep. 1966, vol. 44, No. 1A, 416–417.

Primary Examiner—James H. Derrington
Attorney, Agent, or Firm—Robert L. McKellar

[57] ABSTRACT

What is disclosed is a method of treating particulate, inorganic fillers with certain silanes in a certain manner such that when the fillers are used in organic resins, the viscosity of the normally hard to handle resins is significantly reduced so that the resin is easier to handle.

4 Claims, No Drawings

METHOD OF PREPARING AN IMPROVED ORGANIC RESIN COMPOSITION AND AN IMPROVED ORGANIC RESIN THEREBY

BACKGROUND OF THE INVENTION

This invention relates to a method of preparing improved organic resins.

High molecular weight organic resins have a multiplicity of uses and some of these uses depend on using fillers in conjunction with the organic resins. Fillers, however, have a tendency to increase the viscosity of organic resins, so much so, that resins containing enough filler to give optimum physical properties in the cured resin have very high viscosities leading to significant difficulties in the handling of the resins prior to cure.

Such fabricating and processing techniques such as molding, extruding, sheet forming, casting and embedding require that the resins used in these processes be of a kind that can be easily handled. Thus, many methods have developed which attempt to improve the handling characteristics of the resins.

One such technique is to use a much lower molecular weight resin, or a monomer with a concomitant low viscosity, in conjunction with a high molecular weight resin to give a dilution effect and thus easier handling. This approach suffers from the standpoint that the products prepared from such blends often have unacceptable physical properties and there is a tendency for the low molecular weight materials to bleed from the formed products.

A second manner of reducing the viscosity of organic resins is to reduce the amount of filler actually used in the resin. It is obvious, however, that the use of lesser amounts of filler will lead to reduced benefit of the mineral.

What is needed are organic resins that have enhanced handling properties but which retain good mechanical properties.

It, therefore, follows that what is needed is a method by which such organic resins can be obtained.

The present invention affords such a method and such organic resins.

THE INVENTION

The instant invention deals with organic resins having enhanced handling properties, a method for their preparation and articles manufactured from such resins.

More specifically, this invention deals with resins having higher filler loadings with concomitant lower viscosities.

Organic polymers are of essentially no practical use until they have been transformed by processing techniques into useful forms. Thus, one has to convert liquid resins or meltable solids into physical states which will be useful for the variable applications for which they are intended. Such polymers generally are modified by the inclusion of other materials such as fillers, plasticizers, pigments, antioxidants and the like depending on the properties desired and the end use.

This invention is directed to a solution to the problem of the poor handling characteristics of organic resins when the resin is required to contain fillers to enhance the physical properties.

Whenever organic resins are filled, the viscosity of the resin rises rapidly, depending on the type and amount of filler used, such that at the point where the filler loading induces good physical properties, the resin viscosity is too high and the resin is hard to handle and fabricate. This problem is especially apparent where flow-out of the resin is necessary and where intricate shapes and forms are found in the end products. There is also a problem if the filled resin will not penetrate the fiberglass mats that are used to build composites.

Thus, any organic resin that can contain adequate filler to give good physical properties while having a lower viscosity for better handling is very desirable.

Such resins, and a method for their preparation, can be found herein wherein the method consists of (A) acidifying water to a pH of 3 to 5 using a water-miscible organic carboxylic acid; (B) adding thereto, with constant agitation, a silane selected from a group consisting of $ClCH_2CH_2CH_2Si(OCH_3)_3$, $F_3CCH_2CH_2Si(OCH_3)_3$, $C_{18}H_{37}Si\{OCH_2CH_2N(CH_2CH_3)_2 \cdot HCl\}_3$ and

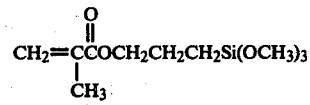

and thereafter stirring the components (A) and (B) until the solution clears; (C) adding to the solution a particulate, inorganic solid and thoroughly mixing the combination of (A), (B) and (C) at a high speed for a time sufficient to treat the particulate, inorganic solid with the hydrolysis product of component (B); (D) removing volatile materials from the combination to obtain a particulate, inorganic hydrate; (E) mixing the product (D) with an organic resin capable of being heat cured and thereafter (F) removing entrapped air from (E) to obtain an organic resin having a reduced viscosity over that of an unmodified organic resin.

The method consists of steps (A) through (F) and more specifically, the method consists of prehydrolyzing the silanes, contacting the hydrolysis products with the particulate, inorganic material under conditions in which the particulate, inorganic material is chemically bound with the hydrolysis product and the so-treated particulate, inorganic material is then added to an organic resin whereby the viscosity of the resin is reduced rather than increased.

Step (A) requires that the water of hydrolysis be acidified to a pH of 3-5 using a water-miscible carboxylic acid. The water required for hydrolysis of the silane is first calculated and then sufficient acid is added to the water to give a pH in the range of 3-5 which stabilizes the silanol that is formed by the hydrolysis. A preferred pH range is 3.5-4.5. The addition of the acid can be carried out in any manner which distributes the acid throughout the water. Usable acids include acetic, benzoic, formic, glutaric, glycolic, maleic, malonic, oxalic and the like. Most preferred is acetic.

The addition of a lower molecular weight aliphatic alcohol, or a mixture of such alcohols, to the acidified water helps to solubilize and stabilize the siloxanol formed by the hydrolysis. What we mean by "lower molecular weight aliphatic alcohol" are alcohols such as methyl, ethyl, propyl, butyl, amyl and isopropyl alcohol. Generally, from 25-75 parts by weight of alcohol can be added to the acidified water, based on the weight of alcohol and water present.

Step (B) requires the addition of a silane, with constant agitation, to the mixture of (A). Simple stirring can give adequate agitation for purposes of this invention.

The silanes useful in this invention have been found to be $(CH_3O)_3SiCH_2CH_2CH_2Cl$, $(CH_3O)_3SiCH_2CH_2CF_3$, $\{HCl.(CH_3CH_2)_2NCH_2CH_2O\}_3SiC_{18}H_{37}$ and

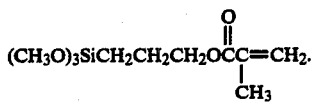

$$(CH_3O)_3SiCH_2CH_2CH_2O\overset{O}{\underset{|}{\overset{\|}{C}}}C=CH_2.$$
$$\phantom{(CH_3O)_3SiCH_2CH_2CH_2OCC}CH_3$$

Other silanes have been tried but they do not seem to give the viscosity reducing effect that is acquired through the use of the above silanes.

Enough silane, as the hydrolyzed silane, is used to give from 0.1 to 5 weight percent of silanes based on the weight of particulate, inorganic solid to be treated. In other words, enough silane is added to give 0.1 to 5 weight percent of the trisilanol —Si(OH)$_3$ on the particulate, inorganic solid. Amounts less than 0.1 weight percent do not seem to give the beneficial effect and amounts over 5 weight percent do not show any enhanced effect over 5 percent, so that, economics would dictate the use of 5 weight percent or less.

In practice, the silane is added to the acidified water mixture or alcohol-water mixture over a period of time such as ½ to 4 hours with constant agitation. The mixture is initially hazy and remains so throughout the addition of the silane. After the completion of the addition of the silane, the mixture is stirred until it become clear. This clearing indicates complete hydrolysis and compatibility in the solvents due to the formation of by-produced alcohols and the formation of silanols on the silicon atom.

Step (C) requires the addition of the particulate, inorganic solid which is to be treated. In order to ensure that the silane chemically bonds with the solid to some degree, the solid is added to the silane hydrolyzate and the whole mixture is mixed thoroughly at a high speed. The speed of the mixer, the amount of shear and the length of time of the mixing is dependent on the silane and solid used and the physical form of the solid. Generally, the time of mixing can range from a few minutes to a few hours.

Step (D) requires that the product of (C) be devolatized in order to remove water and solvents and render a hydrated product. The material in this form is a powdery material which is not necessarily dry enough to be free-flowing. The method of devolatization is not critical and simple vacuum or vacuum with heating is generally sufficient.

In step (E) the product of (D) is mixed with the organic resin. The manner of mixing is not critical and any conventional means or methods can be used as long as the solid is thoroughly and uniformly mixed in the resin. Contemplated within the scope of this invention are organic resins which are heat curable to the solid or elastomeric state. Such resins include polyesters, epoxy resins, polyvinylchloride, polyvinylchloride plastisols and polyurethanes, as well as, silicone resins.

Particulate, inorganic solids contemplated within the scope of this invention include aluminatrihydrate i.e. $Al_2O_3.3H_2O$, zinc borate, silica, magnesium oxide, talc, clay, calcium carbonate, novaculite, mica and silicates in general. Generally, from 50 to 75 weight percent of treated solid is used based on the weight of the solid and the resin.

A preferred embodiment of this invention is the treatment of aluminatrihydrate with chloropropyltrimethoxysilane using acetic acid and water as the hydrolysis medium wherein 1 weight percent of the silane is used. The treated filler is then used to fill polyester resins to reduce the viscosity thereof.

The following examples are offered to illustrate the invention but the examples in no way limit the scope of the invention as more fully set out in the claims.

In the examples, "weight" is by weight percent unless noted otherwise.

EXAMPLE 1

Into a round-bottomed glass flask were placed 40 grams of distilled water and 4 drops of glacial acetic acid. There was then added 40 grams of methanol. To this mixture there was added with stirring, 8 grams of $(CH_3O)_3SiCH_2CH_2CH_2Cl$, until the mixture turned clear. In a waring blender was mixed 5.5 grams of the above solution and 200 grams of $Al_2O_3.3H_2O$ using a high speed for 5-8 minutes.

The above procedure was repeated to produce $Al_2O_3.3H_2O$ having 0.1 weight percent silane; 0.5 weight percent silane and 1 weight percent silane on individual samples. The $Al_2O_3.3H_2O$ was GHA331 manufactured by Great Lakes Minerals Company and having an average particle size of 7.5μ.

Each of the above treated solids was mixed in the ratio of 50 grams solid and 50 grams of P43 polyester manufactured by Rohm and Haas. These mixtures were deaired under vacuum and the effect of the treatment was measured by measuring viscosities on a Brookfield RVT Viscometer at 5 and 50 rpm using a #6 spindle.

| Material | Viscosity (cps) at 25° C. | |
|---|---|---|
| | 5 rpm | 50 rpm |
| polyester only | 6800 | 7000 |
| $Al_2O_3 . 3H_2O$ filled polyester | 90,200 | off scale |
| 1% silane treatment | 56,600 | off scale |

EXAMPLE 2

$Al_2O_3.3H_2O$ was treated as above and used to fill a P43 polyester that had been diluted with styrene. The viscosities were determined on a #5 spindle instead of a #6 as above. The formulation was
 100 grams filler
 60 grams polyester
 10 grams styrene

| Material | Viscosity (cps) at 25° C. | |
|---|---|---|
| | 5 rpm | 50 rpm |
| filled polyester | 71,120 | off scale |
| 0.1% silane | 62,400 | off scale |
| 0.25% silane | 44,000 | off scale |
| 0.5% silane | 36,000 | off scale |

This example clearly illustrates the effect of 0.5 weight percent silane treatment to reduce the viscosity of the polyester by 50%.

That which is claimed is:

1. A method of preparing an improved organic resin composition consisting of
 (A) acidifying water to a pH of 3 to 5 using a water-miscible organic carboxylic acid;
 (B) adding thereto, with constant agitation, chloropropyltrimethoxysilane and thereafter stirring the components (A) and (B) until the solution clears;

(C) adding to the solution particulate aluminatrihydrate and thoroughly mixing the combination of (A), (B), and (C) at a high speed for a time sufficient to treat the particulate aluminatrihydrate with the hydrolysis product of component (B);

(D) removing volatile materials from the combination to obtain a treated particulate aluminatrihydrate;

(E) mixing the product (D) with an organic resin capable of being heat cured and thereafter (F) removing entrapped air from (E) to obtain an organic resin having a reduced viscosity over that of an unmodified organic resin.

2. A method as claimed in claim 1 wherein the acid in (A) is acetic acid and the organic resin in (E) is a thermoset polyester resin.

3. A method as claimed in claim 1 wherein the particulate aluminatrihydrate is treated with 0.1 to 5 weight percent of the hydrolyzed product of (B) based on the combined weight of (C) and the hydrolyzed product of (B).

4. A method as claimed in claim 1 wherein the weight of the product in (D) in the organic resin is from 50 weight percent to 75 weight percent, based on the weight of the product of (D) and the organic resin.

* * * * *